United States Patent
Ruhland

(10) Patent No.: US 6,520,242 B2
(45) Date of Patent: Feb. 18, 2003

(54) PROCESS FOR PRODUCING METAL/ CERAMIC COMPOSITE MATERIALS

(75) Inventor: Norbert Ruhland, Oberboihingen (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 10/193,205

(22) Filed: Jul. 12, 2002

(65) Prior Publication Data

US 2002/0179273 A1 Dec. 5, 2002

Related U.S. Application Data

(62) Division of application No. 09/862,998, filed on May 23, 2001.

(30) Foreign Application Priority Data

May 23, 2000 (DE) .......................................... 100 25 489

(51) Int. Cl.⁷ .......................... B22D 17/10; B22D 19/14
(52) U.S. Cl. ............................ 164/97; 164/113; 164/98
(58) Field of Search ................................ 164/113, 312, 164/97, 98

(56) References Cited

U.S. PATENT DOCUMENTS 5,014,765 A * 5/1991 Aoyama et al. ............ 164/113

FOREIGN PATENT DOCUMENTS

| DE | 44188750 | 11/1995 |
| DE | 19750599 | 7/1998 |
| DE | 19813176 | 9/1999 |
| JP | 010071563 A | 3/1989 |
| JP | 8-215821 | * 8/1996 |

* cited by examiner

Primary Examiner—Kuang Y. Lin
(74) Attorney, Agent, or Firm—Crowell & Moring LLP

(57) ABSTRACT

A method for producing metal/ceramic composite materials includes an injection plunger; a casting chamber having an opening through which casting metal is poured in and a ceramic precursor product is shot in; and a die having a runner and a die cavity. A shot head is used to shoot ceramic powder into a die, so that the powder is compacted to form a porous preform. The preform is infiltrated with liquid metal under pressure in the die.

6 Claims, 2 Drawing Sheets

PROCESS FOR PRODUCING METAL/CERAMIC COMPOSITE MATERIALS

This application is a divisional application of application Ser. No. 09/862,998, filed May 23, 2001.

BACKGROUND AND SUMMARY OF INVENTION

This application claims the priority of German Application No. 100 25 489.6, filed May 23, 2000, the disclosure of which is expressly incorporated by reference herein.

The present invention relates to a device for producing metal/ceramic composite materials and to a process for producing such materials.

DE 197 50 599 discloses a process for producing a metal/ceramic composite material, in which a porous ceramic preform is placed into a pressure die-casting die and is infiltrated with liquid aluminium using the pressure die-casting process. In this process, however, the ceramic preform has to be produced, machined, and placed into a pressure die-casting die in a complex way. This may lead to flexural stresses in the preform if the geometric match between the pressure die-casting die and the preform is inadequate. During the infiltration of the preform as part of the pressure die-casting operation, these flexural stresses may cause the preform to fracture and the component to be scrapped.

Accordingly, the present invention is based on the object of providing a device and a process through which the production of a metal/ceramic composite material is simplified and the process reliability is increased.

The object is achieved by a device and a process according to the present invention.

The device according to the present invention is integrated in a pressure die-casting machine or in a squeeze-casting machine, referred to below as "casting machine" to simplify matters. This device has an injection plunger, a casting chamber with an opening, and a die with a runner and a die cavity. The opening of the casting chamber is suitable for filling the casting chamber (1) with a ceramic precursor product for producing a ceramic preform and (2) with a liquid casting metal. This has the resultant advantage that the preform is produced directly in the mold cavity in which it is subsequently infiltrated with the casting metal, so that no further significant remachining is required. The infiltration results in the production of a metal/ceramic composite material or a component made from the composite material. The term "ceramic precursor product" means a ceramic powder or a ceramic powder mixture which may contain further organic or inorganic auxiliaries.

The powder is transferred, via the opening into the casting chamber, and from there into the runner and the mold cavity, where it is compressed to form the preform. In this context, the term "pressing" is understood as meaning compacting of the powder which, depending on the pressure applied, may express itself as a self-supporting structure of intermeshing powder grains or in the form of a loose powder bed. For this operation, a high pressure is required, which can be produced with minimum technical outlay by a shot head. The term shot head is understood as meaning a device which presses pulverulent dry or moist material into a mold by gas pressure and/or mechanical pressure.

The shot head is mounted movably with respect to the opening and can be exchanged for a casting ladle, which is likewise mounted movably with respect to the opening. The casting ladle is used to fill the casting chamber with the liquid casting metal. This device enables the casting chamber to be used to fill the die cavity with different media in succession.

Further, a suction or blowing device can be fitted onto the opening, which device sucks or blows residual powder, in particular which remains in the casting chamber after the powder has been pressed into the mold cavity, out of the casting chamber. In the process, contamination of the casting metal with the powder is prevented, since this would impair the casting performance and the infiltration performance of the casting metal.

In the runner, the die has a blocking slide which, after the die cavity has been filled with the powder, prevents the powder from dropping back into the casting chamber. The closure device of the slide is coupled to the drive of the injection plunger, enabling the slide to be opened when the casting metal is pressed into the runner by the injection plunger.

In conventional pressure die casting, the runner of the die serves, inter alia, to provide further casting metal for recompression after the die cavity has been filled with the casting metal. The device according to the present invention also causes the ceramic powder to be recompressed. In terms of bulk density, this powder takes up a greater volume than a liquid casting metal. For this reason, the runner of the die of the device according to the present invention is designed with a larger volume than is the case with a conventional die. According to the present invention, the volume is between 10% and 30% of the volume of the die cavity, thus ensuring that there is always sufficient powder available for recompression of the preform.

In a further embodiment, a device according to the present invention comprises a die with a mold cavity and a runner which, through a notch, has an opening leading to the die cavity. The die is integrated in a casting machine and, unlike a conventional die, includes at least two openings for filling with material. One opening is used to convey a pressurized powder into the mold cavity and thus to produce a porous ceramic preform in the die cavity. The second opening comprises the notch of the runner and is used to fill the die cavity with a liquid casting metal. With the aid of this device, it is possible to produce the porous ceramic preform directly in the mold cavity and then for this preform to be infiltrated with the casting metal so as to produce a composite material. The opening for filling with powder can be arranged at the most suitable point on the die. The position of this opening depends on the design of the die and of the casting machine. It may be arranged in such a way that the distance which the powder has to cover from the opening into the die cavity is as short as possible.

The powder can be pressed into the die cavity by a shot head. The shot head of a conventional core-shooting machine is recommended for this purpose. This head is usually mounted in a fixed position at the opening of the die, which is advantageous for metering of the powder. Furthermore, the short conveying path allows a relatively high pressure to be applied to the powder, with an associated high degree of compacting.

It is expedient for the die cavity to be closed off from the runner by a blocking slide, in order to ensure a counter-pressure for compacting the powder to form the preform. Furthermore, after the die cavity has been filled with the powder, the opening to the shot head can be closed by a blocking slide. This prevents the casting metal from escaping from the die cavity while it is filling the latter.

To prevent outlet valves that vent the die cavity from becoming blocked, the device has a filter channel, which is illustrated in FIG. 3 and narrows conically, in front of each of the outlet valves. The passage opening is designed to be sufficiently narrow, as a function of the condition of the powder, for it to become blocked according to the present invention by powder but to be permeable to gaseous media. Furthermore, the filter channel is applied in such a way that its center axis lies in a parting plane between two parts of the die. This has the advantageous effect that the filter channel is cleaned after opening of the die and ejection of the component.

It is possible to place an insert, which fills up certain regions of the mold cavity, in a fixed position in the mold cavity. These regions are not filled while the powder is pressed in and are not represented in the form of a preform. If the geometry of the insert avoids undercuts, as is necessary when designing dies, the insert can be removed after production of the preform. The regions which are now clear and have not been filled by the preform are thus filled by the casting metal alone. As has been described, the preform is infiltrated with the casting metal, so that the composite material is formed, the assumption being that the preform has a self-supporting structure. This has the advantage that the component produced in some regions consists of metal and in some regions consists of composite material. Accordingly, the component has local reinforcements, so that it can optimally satisfy the demands imposed on its materials properties.

A further subject of the present invention is a process for producing a composite material in which a porous ceramic preform is produced in the die cavity of a die and is then infiltrated with a casting metal. This takes place as a result of a powder being pressed into the die cavity by a blowing medium (usually compressed air) via an opening. As a result, a porous ceramic preform, which in a second process step is infiltrated with a casting metal, is formed in the die cavity. The result is a composite material or a component which consists at least partially of the composite material. The advantage of this process is that the preform is produced directly in the die, no machining is required and the preform is optimally adapted to the geometry of the die cavity.

For optimal filling of the die cavity with the powder, it is important for this powder to be fluidized by the compressed air, thus behaving like a Newtonian fluid and moving substantially in the form of a laminar flow.

Further, the blowing medium for the powder is pressed out of the die cavity through outlet valves. To prevent the outlet valves from becoming blocked, they are in each case protected by a filter channel.

While the die cavity is being filled with the powder, it is appropriate for all the further openings which the die cavity may have and which are not used for venting the die cavity (e.g., filter channels) to be closed, so that the necessary counter-pressure for compacting the powder can be built up and the powder cannot escape from the die cavity. It is appropriate for the opening of the die cavity through which the powder is introduced to be closed during infiltration of the preform with the casting metal, provided that filling with the powder and with the casting metal do not take place through the same opening of the die cavity.

The optimum grain structure of the powder is as far as possible of spherical nature for good fluidization of the powder. Another advantage is that the grain diameters are scattered about a mean in similar manner to a Gaussian distribution and thus have a monomodal distribution. In general, it is possible to manufacture machine parts with a tolerance of 50 $\mu$m. To minimize die wear, the minimum grain size of the powder should be over 50 $\mu$m, in particular over 100 $\mu$m.

In the context of the process employed, it is expedient to use casting metals which are also employed in the pressure die-casting process or squeeze-casting process, i.e. alloys which are based on aluminium or magnesium.

Other objects, advantages and novel features of the present invention will become apparent from the following detailed description of the invention when considered in conjunction with the accompanying drawings.

DETAILED DESCRIPTION OF DRAWINGS

Figure 1:
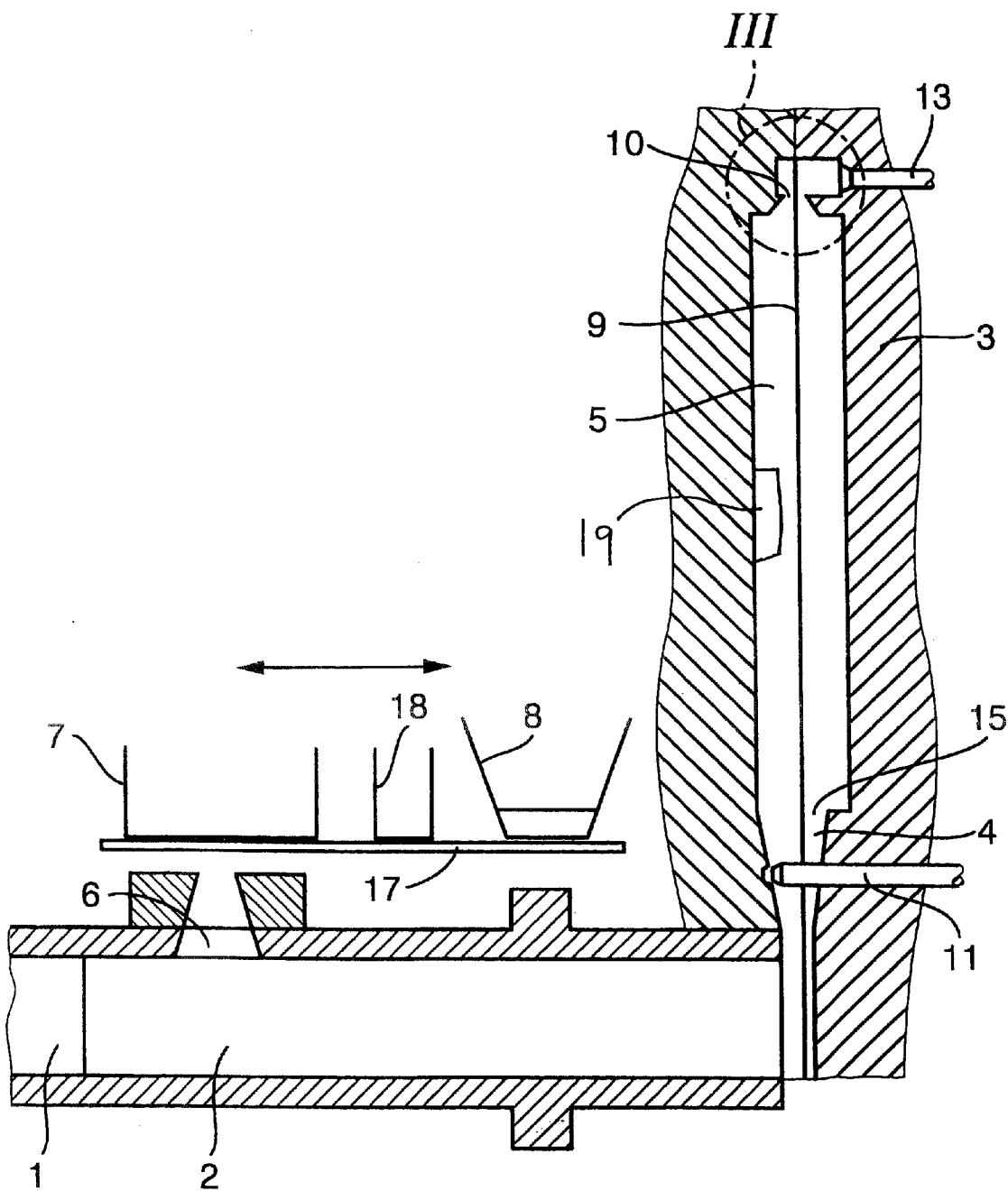
FIG. 1 shows a device according to the present invention which is integrated in a casting machine and has a shot head and a casting ladle in addition to an opening of the casting chamber.

FIG. 1 shows a device which comprises an injection plunger 1, a casting chamber 2 and a die 3 with a runner 4, a blocking slide 11 and a die cavity 5 and which is integrated in a casting machine (not shown in more detail). The casting chamber 2 has an opening 6. Above this opening 6 there is a rail 17, on which a shot head 7, a suction device 18 and a casting ladle 8 are movably mounted. The shot head 7 is similar to that of a conventional core-shooting machine and is provided for the purpose of pressing a defined quantity of a powder into the die cavity 5 via the casting chamber 2.

The suction device 18 is used to suck powder residues out of the casting chamber 2. Via the casting ladle 8, a casting metal is metered into the casting chamber, from where it is pressed into the die cavity 5 by the injection plunger 1.

Figure 3:
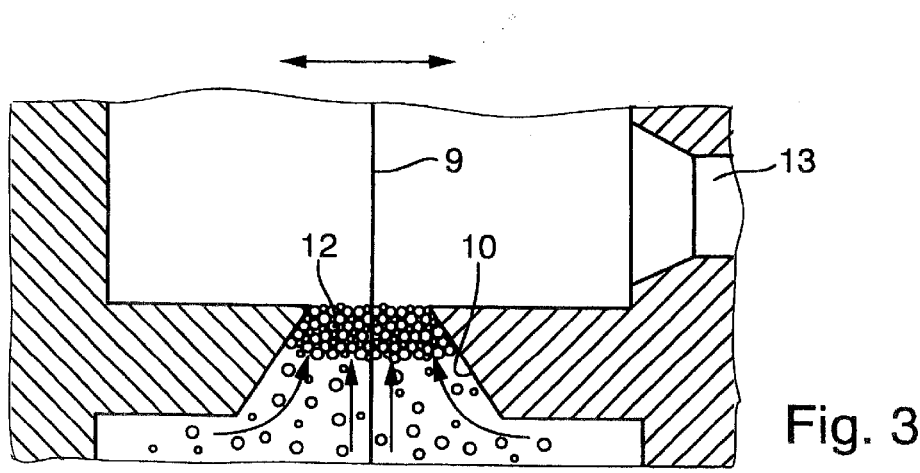
FIG. 3 shows a detail III of the filter channel from FIG. 1.

Outlet valves 13 allow compressed air, which is introduced by the shot head 7 and serves as conveying medium for the powder, to escape. Filter channels 10, which are illustrated in detail in FIG. 3, are mounted in front of the outlet valves 13 and prevent the outlet valves 13 from being damaged by powder particles 12. The filter channels 10 are conically shaped, and the minimum diameter is designed in just such a way that the filter channels 10 become blocked by the powder but are permable to air. The center axis of the filter channels 10 is situated in a parting plane 9 of the die 3 which divides the die 3 into two halves. Consequently, the filter channels 10 clean themselves when the die 3 is opened in the parting plane 9 (FIG. 3).

Figure 2:
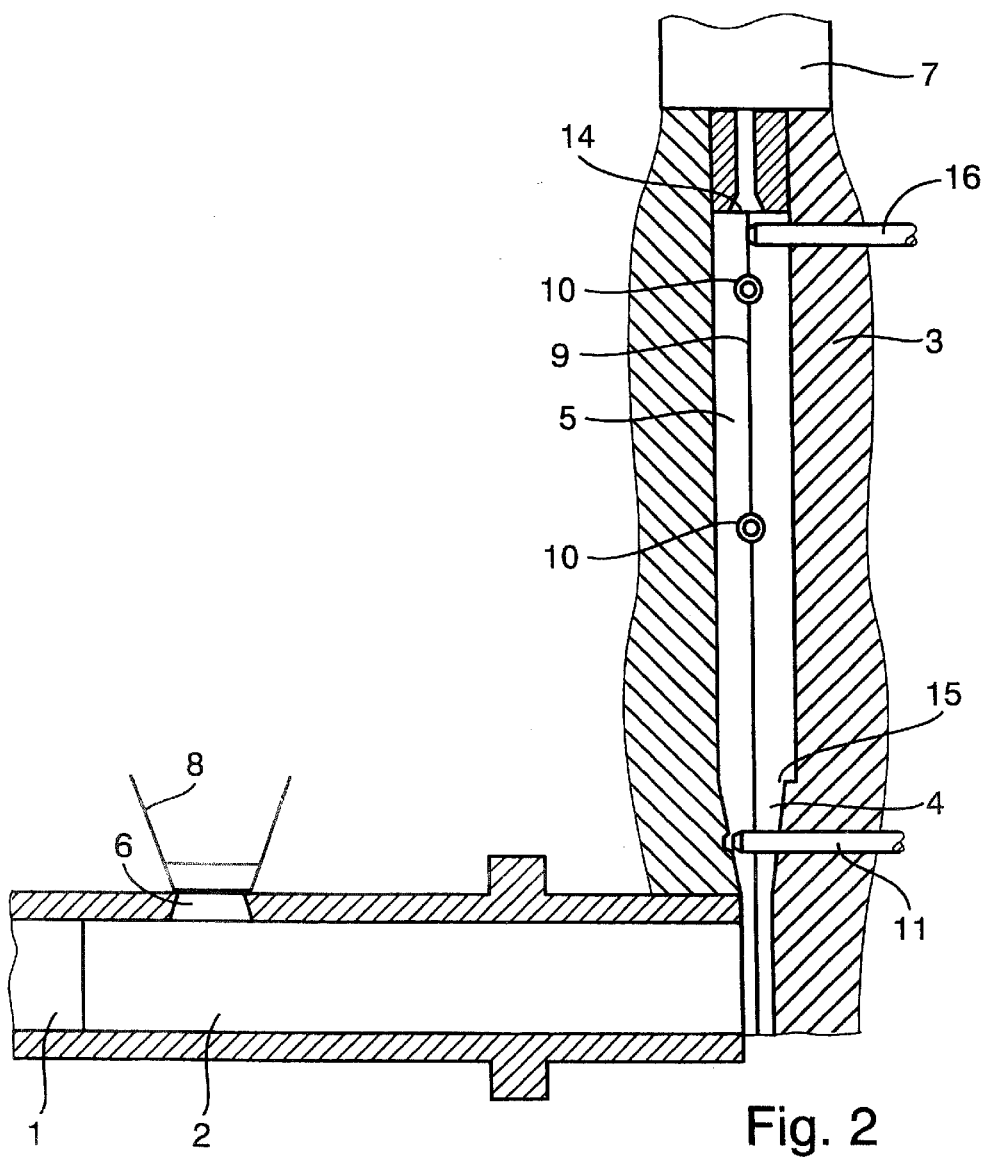
FIG. 2 shows a device according to the present invention which is integrated in a casting machine and has a die and a shot head fitted thereto.

FIG. 2 shows a further configuration of the device according to the present invention. This is once again integrated in a casting machine, has an injection plunger 1, a casting chamber 2, a die 3 with a runner 4 and a die cavity 5. In this device, a shot head 7 is arranged in such a way that the die cavity 5 is filled with a powder via an opening 14 in the top side of the die 3. This opening 14 can be closed off by means of a blocking slide 16. A further blocking slide 11 is situated at the runner 4, preventing the powder from penetrating into the casting chamber 2. In this example, filter channels 10, which are situated in front of outlet valves 13, which are not shown in FIG. 2, are in a horizontal position with respect to the die.

The process according to the present invention for producing a metal/ceramic composite material using the devices described is explained in more detail with reference to the following examples.

EXAMPLE 1

A ceramic powder, which consists of silicon carbide (SiC) and has a mean grain size of 150 $\mu$m, is introduced into a shot head 7 via a metering device. The shot head 7 is situated (in a similar manner to that shown in FIG. 1) on a rail 17, together with a suction device 18 and a casting ladle 8. A compressed-air reservoir of the shot head 7 is suddenly opened, so that the powder is pressed through an opening 6 in the casting chamber 2 into the casting chamber 2 and, from there, into the runner 4 and the die cavity 5 of the die 3.

The compressed air is discharged from the die cavity 5 via outlet valves 13. The powder and the compressed air are separated by the air/powder mixture being pressed through a filter channel 10 which tapers conically and, after approx. 100 ms, becomes blocked by powder particles 12. Since the powder, in compressed form, forms a porous body and is consequently gas-permeable, the compressed air can penetrate through the blocked filter channels 10 without obstacle and can escape through the outlet valves 13, which are in each case situated downstream of the filter channels 10.

The pressure which is generated by the compressed air of the shot head 7 is sufficient to compress the powder to form an inherently solidly cohesive preform. The quantity of metered powder is such that the preform fills up the entire die cavity 5 and is accurately adapted to the contours of this cavity.

After the preform has been produced, the runner 4 is closed by a blocking slide 11, thus preventing powder residues from trickling back into the casting chamber 2. Then, the shot head 7 is shifted one position on the rail 17, so that the suction device 18 is situated above the opening 6 of the casting chamber 2 and sucks powder residues out of the casting chamber 2.

In the next process step, the casting ladle 8 is positioned above the opening 6 and the casting chamber 2 is filled with casting metal. The injection plunger 1 is set in motion, and at the same time the blocking slide 11 in the runner 4 is opened. The casting metal is pressed into the die cavity 5 through the runner 4 in less than 100 ms, the preform being infiltrated by the casting metal. Then, the die 3 is opened, and a component which has been produced by this process is ejected. The component consists of a composite material, both the metallic and the ceramic matrix being three-dimensionally joined to one another.

EXAMPLE 2

As Example 1, except that the shot head 7 is arranged on the die 3, as shown in FIG. 2. The powder is pressed into the die cavity 5 via an opening, which can be closed by a blocking slide 16, in the die 3 in front of the shot head 7. The blocking slide 11 in the runner 4 prevents the powder from penetrating into the casting chamber 2. After the preform has been pressed into the die cavity 5, the blocking slide 16 in front of the shot head 7 is closed and the casting chamber 2 is filled with the casting metal via the casting ladle 8. The injection plunger 1 is set in motion, while at the same time the blocking slide 11 in the runner 4 is opened. The casting metal is pressed into the die cavity 5 by the injection plunger 1 and the preform is infiltrated with the casting metal. The result is a component made from the same composite material as in Example 1.

EXAMPLE 3

Example 3 may be carried out as in Example 1 or Example 2, except that an insert 19 is introduced into the die cavity 5, which insert fills defined regions of the die cavity 5. After the powder has been pressed into the die cavity 5, the die 3 is opened, the insert is removed with the aid of a casting robot and the die 3 is closed again. The die cavity 5 is filled with the casting metal in a similar manner, once again, to Examples 1 or 2. The component produced in this way has regions made from metal and regions made from the composite material.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A process for producing metal/ceramic composite materials, comprising:
   shooting a ceramic precursor product under gas pressure via a blowing medium, through an opening, into a die cavity of a die;
   forming a preform from the ceramic precursor product; and
   infiltrating the preform with a casting metal under pressure in the die.

2. A process according to claim 1, wherein the ceramic precursor product is fluidized by the gas pressure.

3. A process according to claim 1, further comprising separating the ceramic precursor product from the blowing medium by a filter channel before the blowing medium leaves the die cavity through an outlet valve.

4. A process according to claim 1, further comprising opening or closing one or more openings of the die cavity.

5. A process according to claim 1, wherein the ceramic precursor product comprises a powder having a globular grain structure with a Gaussian distribution and a minimum grain size of more than 50 $\mu$m.

6. A process according to claim 1, wherein the casting metal comprises at least one of aluminium, magnesium, an aluminum alloy, or a magnesium alloy.

* * * * *